United States Patent [19]

Li

[11] 4,077,947

[45] Mar. 7, 1978

[54] TERPOLYMERS COMPRISING OLEFINIC NITRILES, N-VINYLIMIDES AND INDENE OR COUMARONE AND PROCESS FOR PREPARING THE COMPOSITIONS

[75] Inventor: George S. Li, Aurora, Ohio

[73] Assignee: Standard Oil Company, Cleveland, Ohio

[21] Appl. No.: 759,813

[22] Filed: Jan. 17, 1977

[51] Int. Cl.$^2$ .................. C08G 69/00; C08G 73/10
[52] U.S. Cl. ................ 260/78 UA; 526/193; 526/229; 526/258; 526/263; 526/267
[58] Field of Search .................. 526/263, 267; 260/78 UA

[56] References Cited

U.S. PATENT DOCUMENTS

| | | | |
|---|---|---|---|
| 3,322,730 | 5/1967 | Grosser et al. | 526/263 |
| 3,352,832 | 11/1967 | Barr et al. | 260/78 UA |
| 3,652,726 | 3/1972 | Nield et al. | 260/78 UA |
| 3,666,720 | 5/1972 | Nield et al. | 260/78 UA |
| 3,676,404 | 7/1972 | Nield | 260/78 UA |
| 3,721,724 | 3/1973 | Vebele et al. | 260/78 UA |
| 3,766,142 | 10/1973 | Nield et al. | 260/78 UA |
| 3,926,871 | 12/1975 | Hensley | 526/267 |
| 3,926,926 | 12/1975 | Li et al. | 526/267 |

*Primary Examiner*—Herbert J. Lilling
*Attorney, Agent, or Firm*—John F. Jones; Larry W. Evans

[57] ABSTRACT

Polymer resins which are thermoplastic and high softening with good impermeability to gases are composed of an olefinically unsaturated nitrile, such as acrylonitrile, an N-vinyl imide, such as N-vinyl succinimide, and indene.

9 Claims, No Drawings

TERPOLYMERS COMPRISING OLEFINIC NITRILES, N-VINYLIMIDES AND INDENE OR COUMARONE AND PROCESS FOR PREPARING THE COMPOSITIONS

The present invention relates to novel polymeric compositions which are thermoplastic and have high softening temperatures and low permeablility to gases and, more particularly, pertains to high softening compositions which have high flexural strengths, flexural modulus and are composed of the essential components of an olefinically unsaturated nitrile, an N-vinyl imide and indene, and to a process for preparing them.

The novel polymeric products of the present invention are prepared by polymerizing a major portion of an olefinically unsaturated nitrile, such as acrylonitrile, and a minor portion of an N-vinyl imide, such as N-vinyl succinimide, and indene.

The olefinically unsaturated nitriles useful in this invention are the alpha,beta-olefinically unsaturated mononitriles having the structure

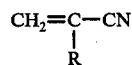

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The preferred olefinically unsaturated nitrile in the present invention is acrylonitrile.

The N-vinyl imides include N-vinyl succinimide, N-vinyl glutarimide, and N-vinyl phthalimide. Most preferred is N-vinyl succinimide.

Indene (1-H-indene) and coumarone (2,3-benzofuran) and mixtures are useful as monomers in the present invention. Most preferred is indene.

The polymeric compositions of the present invention can be prepared by any of the known general techniques of polymerization, including the bulk polymerization solution polymerization, and emulsion or suspension polymerization techniques by batch, continuous or intermittent addition of the monomers and other components. The preferred method is the aqueous medium polymerization by emulsion or suspension techniques. The polymerization is preferably carried out in an aqueous medium in the presence of an emulsifier and a free-radical generating polymerization initiator at a temperature of from about 0 to 100° C in the substantial absence of molecular oxygen.

The preferred polymeric compositions embodied herein are those resulting from the polymerization of (A) from about 30 to 90% by weight of at least one nitrile having the structure

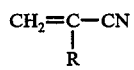

wherein R has the foregoing designation, (B) from about 5 to 55% by weight of an N-vinyl imide and (C) from about 1 to 25% by weight of at least one member selected from the group consisting of indene and coumarone wherein the given percentages of (A), (B) and (C) are based on the combined weight of (A), (B) and (C).

More specifically, the present invention can be illustrated in the polymerization of a mixture of acrylonitrile, N-vinyl succinimide, and indene to produce a product having exceptionally good impermeability to gases and vapors, and excellent ASTM heat-distortion temperature. Preferably, the acrylonitrile, N-vinyl succinimide, indene monomer component should contain 35 to 70% by weight of acrylonitrile, 5 to 50% by weight of N-vinyl succinimide and 5 to 25% by weight of indene.

The novel resins of the present invention are thermoplastic materials which can be thermoformed into a wide variety of useful articles in any of the conventional ways employed with known thermoplastic materials, such as by extrusion, milling, molding, drawing, blowing, etc. The polymeric products of this invention have excellent solvent resistance, and their high softening temperatures make them extremely useful engineering thermoplastics for use in the construction industry as well as in the packaging industry, and they are particularly useful in the manufacture of bottles, film, sheet, laminates with other plastics, and other kinds of containers and wrappings for liquids and solids.

In the following illustrative examples, the amounts of ingredients are expressed in parts by weight unless otherwise indicated.

EXAMPLE 1

A. An aqueous emulsion polymerization was carried out using the following ingredients and procedure:

| Ingredient | Parts |
|---|---|
| water | 250 |
| Gafac RE-610 emulsifier* | 2.5 |
| acrylonitrile | 70 |
| N-vinyl succinimide | 10 |
| indene | 20 |
| n-dodecyl mercaptan | 0.1 |
| potassium persulfate | 0.3 |

*A mixture of $R\text{—}O\text{—}(CH_2CH_2O\text{—})_n PO_3M_2$ and $[R\text{—}O\text{—}(CH_2CH_2O\text{—})_n]_2PO_2M$ wherein n is a number from 1 to 40, R is an alkyl or alkaryl group and preferably a nonyl phenyl group, and M is hydrogen, ammonia or an alkali metal, which composition is sold by GAF Corporation.

The polymerization was carried out at 60° C with stirring under a nitrogen atmosphere for 16 hours. A conversion of monomers to polymer which are greater than 60% of theory was obtained. The resin was isolated by coagulation of the latex followed by washing and drying of the solid resin. This resin was found to have the following properties:

| | |
|---|---|
| ASTM heat-distortion temperature (264 psi) | 114° C |
| flexural strength | $12.8 \times 10^3$ psi |
| flexural modulus | $6.2 \times 10^5$ psi |

B. A polymer which is outside the scope of this invention was prepared by the procedure of A of this example using 30 parts of indene and no N-vinyl succinimide. The resulting resin was found to have the following properties:

| | |
|---|---|
| ASTM heat-distortion temperature | 114° C |
| flexural strength | $4.95 \times 10^3$ psi |
| flexural modulus | $5.50 \times 10^5$ psi |

EXAMPLE 2

The procedure of Example 1A was repeated using 60 parts of acrylonitrile, 20 parts of N-vinyl succinimide and 20 parts of indene. The resulting resin was found to have the following properties:

| ASTM heat-distortion temperature | 128° C |
|---|---|
| flexural strength | $10.9 \times 10^3$ psi |
| flexural modulus | $6.27 \times 10^5$ psi |

EXAMPLE 3

The procedure of Example 1A was repeated using 50 parts of acrylonitrile, 35 parts of N-vinyl succinimide and 15 parts of indene. The resulting resin was found to have the following properties:

| ASTM heat-distortion temperature | 136° C |
|---|---|
| flexural strength | $14.4 \times 10^3$ psi |
| flexural modulus | $6.59 \times 10^5$ psi |
| ASTM oxygen transmission rate | 0.4 cc/mil/ 100 inches$^2$/ 24 hours/ atmosphere |

EXAMPLE 4

The procedure of Example 1A was repeated using 40 parts of acrylonitrile, 45 parts of N-vinyl succinimide and 15 parts of indene. The resulting resin was found to have the following properties:

| ASTM heat-distortion temperature | 142° C |
|---|---|
| flexural strength | $11.9 \times 10^3$ psi |
| flexural modulus | $7.10 \times 10^5$ psi |
| ASTM oxygen transmission rate | 0.64 cc/mil/ 100 inches$^2$/ 24 hours/ atmosphere |

EXAMPLE 5

The procedure of Example 1A was repeated using 35 parts of acrylonitrile, 50 parts of N-vinyl succinimide and 15 parts of indene. The resulting resin was found to have the following properties:

| ASTM heat-distortion temperature | 142° C |
|---|---|
| flexural strength | $11.2 \times 10^3$ psi |
| flexural modulus | $6.79 \times 10^5$ psi |

EXAMPLE 6

Repeats of the procedures of the preceding examples in which N-vinyl phthalimide was substituted for N-vinyl succinimide gave similar results.

I claim:

1. The terpolymer composition resulting from the copolymerization in the presence of a free-radical initiator of
   A. from about 30 to 90% by weight of at least one nitrile having the structure

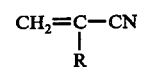

wherein R is hydrogen, a lower alkyl group having from 1 to 4 carbon atoms, or a halogen,
   B. from about 5 to 55% by weight of an N-vinyl imide selected from the group consisting of N-vinyl succinimide, N-vinyl glutarimide, and N-vinyl phthalimide, and
   C. from about 1 to 25% by weight of at least one member selected from the group consisting of indene and coumarone wherein the given percentages of (A), (B) and (C) are based on the combined weight of (A), (B) and (C).

2. The composition of claim 1 wherein (A) is acrylonitrile.

3. The composition of claim 2 wherein (B) is N-vinyl succinimide.

4. The composition of claim 3 wherein (C) is indene.

5. The method comprising polymerizing in an aqueous medium in the substantial absence of molecular oxygen and in the presence of a free-radical polymerization initiator a mixture of
   A. from about 30 to 90% by weight of at least one nitrile having the structure

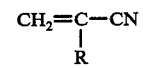

wherein R is hydrogen, a lower alkyl group having from 1 to 4 carbon atoms, or a halogen,
   B. from about 5 to 55% by weight of an N-vinyl imide selected from the group consisting of N-vinyl succinimide, N-vinyl glutarimide, and N-vinyl phthalimide, and
   C. from about 1 to 25% by weight of at least one member selected from the group consisting of indene and coumarone wherein the given percentages of (A), (B) and (C) are based on the combined weight of (A), (B) and (C).

6. The method of claim 5 carried out at a temperature in the range of from 0° to 100° C.

7. The method of claim 6 wherein (A) is acrylonitrile.

8. The method of claim 7 wherein (B) is N-vinyl succinimide.

9. The method of claim 8 wherein (C) is indene.

* * * * *